(12) United States Patent
Matsumoto et al.

(10) Patent No.: US 11,456,469 B2
(45) Date of Patent: Sep. 27, 2022

(54) FUEL CELL SYSTEM

(71) Applicant: TOYOTA JIDOSHA KABUSHIKI KAISHA, Toyota (JP)

(72) Inventors: Shun Matsumoto, Toyokawa (JP); Yoshikatsu Fujimura, Toyota (JP); Shigeki Hasegawa, Toyota (JP); Shuya Kawahara, Toyota (JP); Takeho Aisaka, Toyota (JP); Hiroyuki Imanishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/213,512

(22) Filed: Mar. 26, 2021

(65) Prior Publication Data

US 2021/0376355 A1 Dec. 2, 2021

(30) Foreign Application Priority Data

May 26, 2020 (JP) .............................. JP2020-091581

(51) Int. Cl.
| | |
|---|---|
| *H01M 8/04* | (2016.01) |
| *H01M 8/04746* | (2016.01) |
| *H01M 8/04089* | (2016.01) |
| *H01M 8/04303* | (2016.01) |
| *H01M 8/04858* | (2016.01) |

(52) U.S. Cl.
CPC ..... *H01M 8/04776* (2013.01); *H01M 8/0488* (2013.01); *H01M 8/04089* (2013.01); *H01M 8/0494* (2013.01); *H01M 8/04303* (2016.02)

(58) Field of Classification Search
CPC ......... H01M 8/04776; H01M 8/04303; H01M 8/04089; H01M 8/0494
See application file for complete search history.

(56) References Cited

U.S. PATENT DOCUMENTS

| | | |
|---|---|---|
| 2019/0140290 A1 | 5/2019 | Namba et al. |
| 2019/0140291 A1 | 5/2019 | Namba et al. |
| 2019/0140294 A1 | 5/2019 | Namba et al. |
| 2019/0190049 A1* | 6/2019 | Ishitoya ............ H01M 8/04761 |

FOREIGN PATENT DOCUMENTS

| | | |
|---|---|---|
| JP | 2006278153 A | 10/2006 |
| JP | 2019079757 A | 5/2019 |
| JP | 2019087468 A | 6/2019 |
| JP | 2019087469 A | 6/2019 |
| JP | 2019087470 A | 6/2019 |

* cited by examiner

*Primary Examiner* — Olatunji A Godo
(74) *Attorney, Agent, or Firm* — Dickinson Wright, PLLC

(57) ABSTRACT

A fuel cell system including a fuel cell, an air compressor that supplies oxidant gas to the fuel cell, an upstream supply pipe provided with the air compressor, a downstream supply pipe connected to the upstream supply pipe and the fuel cell, an upstream discharge pipe connected to the fuel cell, a downstream discharge pipe connected to the upstream discharge pipe, a bypass pipe, a valve mechanism configured to be switchable between a supply state and a bypass state, and a controller configured to control the air compressor, the valve mechanism, and a power generation state of the fuel cell.

9 Claims, 9 Drawing Sheets

FUEL CELL SYSTEM

CROSS-REFERENCE TO RELATED APPLICATION

This application is based upon and claims the benefit of priority of the prior Japanese Patent Application No. 2020-091581, filed on May 26, 2020, the entire contents of which are incorporated herein by reference.

TECHNICAL FIELD

The present disclosure relates to a fuel cell system.

BACKGROUND

When a power output request to the fuel cell is not made, an intermittent operation for maintaining an open-circuit voltage of a fuel cell at a predetermined target voltage in a power generation temporarily stopped state is executed by bringing the fuel cell into the power generation temporarily stopped state and by intermittently driving an air compressor (See, for example, Japanese Unexamined Patent Application Publication No. 2019-079757).

If the open-circuit voltage increases excessively beyond the target voltage, the fuel cell might need to generate extra power in order to reduce the voltage, which might increase fuel gas consumption.

SUMMARY

It is therefore an object of the present disclosure to provide a fuel cell system capable of suppressing an open-circuit voltage of a fuel cell from excessively increasing.

The above object is achieved by a fuel cell system including: a fuel cell; an air compressor that supplies oxidant gas to the fuel cell; an upstream supply pipe provided with the air compressor; a downstream supply pipe connected to the upstream supply pipe and the fuel cell; an upstream discharge pipe connected to the fuel cell, the oxidant gas being discharged from the fuel cell to the upstream discharge pipe; a downstream discharge pipe connected to the upstream discharge pipe; a bypass pipe, one end of the bypass pipe being connected to a first connection part where the upstream supply pipe is connected to the downstream supply pipe, another end of the bypass pipe being connected to a second connection part where the upstream discharge pipe is connected to the downstream discharge pipe; a valve mechanism configured to be switchable between a supply state and a bypass state, the supply state being a state where the oxidant gas is supplied to the fuel cell from the upstream supply pipe and the downstream supply pipe and is discharged from the upstream discharge pipe and the downstream discharge pipe, the bypass state being a state where the oxidant gas passes through the bypass pipe from the upstream supply pipe and is discharged from the downstream discharge pipe and where the oxidant gas is restricted from passing through one of the downstream supply pipe and the upstream discharge pipe; and a controller configured to control the air compressor, the valve mechanism, and a power generation state of the fuel cell, wherein the controller is configured to include: a voltage obtainer configured to obtain an open-circuit voltage which is a voltage of the fuel cell in a power generation temporarily stopped state; an intermittent operation executor configured to execute an intermittent operation for maintaining the open-circuit voltage at a target voltage, by bringing the fuel cell into the power generation temporarily stopped state, by bringing the valve mechanism into the supply state, and by intermittently driving the air compressor, when a power output request to the fuel cell is not made; and a decrease process executor configured to execute an open-circuit voltage decrease process for accelerating a decrease in the open-circuit voltage, by bringing the valve mechanism into the bypass state and by stopping the air compressor in the power generation temporarily stopped state.

The above object is also achieved by a fuel cell system including: a fuel cell; an air compressor that supplies oxidant gas to the fuel cell; an upstream supply pipe provided with the air compressor; a downstream supply pipe connected to the upstream supply pipe and the fuel cell; a discharge pipe connected to the fuel cell, the oxidant gas being discharged from the fuel cell to the discharge pipe; a bypass pipe, one end of the bypass pipe being connected to a connection part where the upstream supply pipe is connected to the downstream supply pipe, another end of the bypass pipe is exposed to outside air; a valve mechanism configured to be switchable between a supply state and a bypass state, the supply state being a state where the oxidant gas is supplied to the fuel cell from the upstream supply pipe and the downstream supply pipe and is discharged from the discharge pipe, the bypass state being a state where the oxidant gas passes through the upstream supply pipe and is discharged from the bypass pipe and where the oxidant gas is restricted from passing through one of the downstream supply pipe and the discharge pipe; and a controller configured to control the air compressor, the valve mechanism, and a power generation state of the fuel cell, wherein the controller is configured to include: a voltage obtainer configured to obtain an open-circuit voltage which is a voltage of the fuel cell in a power generation temporarily stopped state; an intermittent operation executor configured to execute an intermittent operation for maintaining the open-circuit voltage at a target voltage, by bringing the fuel cell into the power generation temporarily stopped state, by bringing the valve mechanism into the supply state, and by intermittently driving the air compressor, when a power output request to the fuel cell is not made; and a decrease process executor configured to execute an open-circuit voltage decrease process for accelerating a decrease in the open-circuit voltage, by bringing the valve mechanism into the bypass state and by stopping the air compressor in the power generation temporarily stopped state.

The decrease process executor may be configured to execute the open-circuit voltage decrease process, when the power output request to the fuel cell is not made, before the intermittent operation starts.

The decrease process executor may be configured to execute the open-circuit voltage decrease process, when the open-circuit voltage is equal to or higher than an upper limit voltage higher than the target voltage during execution of the intermittent operation.

The intermittent operation executor may be configured to execute the intermittent operation, when an execution condition of the intermittent operation is satisfied during execution of the open-circuit voltage decrease process, and the execution condition may include a condition that the open-circuit voltage is equal to or lower than a voltage threshold value.

The controller may be configured to include a flow rate obtainer configured to obtain a flow rate correlation value that correlates with a flow rate of the oxidant gas flowing to the fuel cell, and the execution condition may include a condition that the flow rate correlation value is equal to or smaller than a flow rate threshold value.

The execution condition may include a condition that the open-circuit voltage is equal to or lower than the voltage threshold value, the flow rate correlation value is greater than the flow rate threshold value, and the open-circuit voltage is equal to or lower than a lower limit voltage lower than the voltage threshold value.

The execution condition may include a condition that the open-circuit voltage is equal to or lower than the voltage threshold value, the flow rate correlation value is greater than the flow rate threshold value, and a decreasing speed of the open-circuit voltage is equal to or higher than a speed threshold value.

The controller may be configured to include a rotational speed obtainer configured to obtain a rotational speed of the air compressor, and the execution condition may include a condition that the open-circuit voltage is equal to or lower than the voltage threshold value, the flow rate correlation value is greater than the flow rate threshold value, and the rotational speed is equal to or lower than a rotational speed threshold value.

DETAILED DESCRIPTION

[Schematic Configuration of Fuel Cell System 1]

Figure 1:
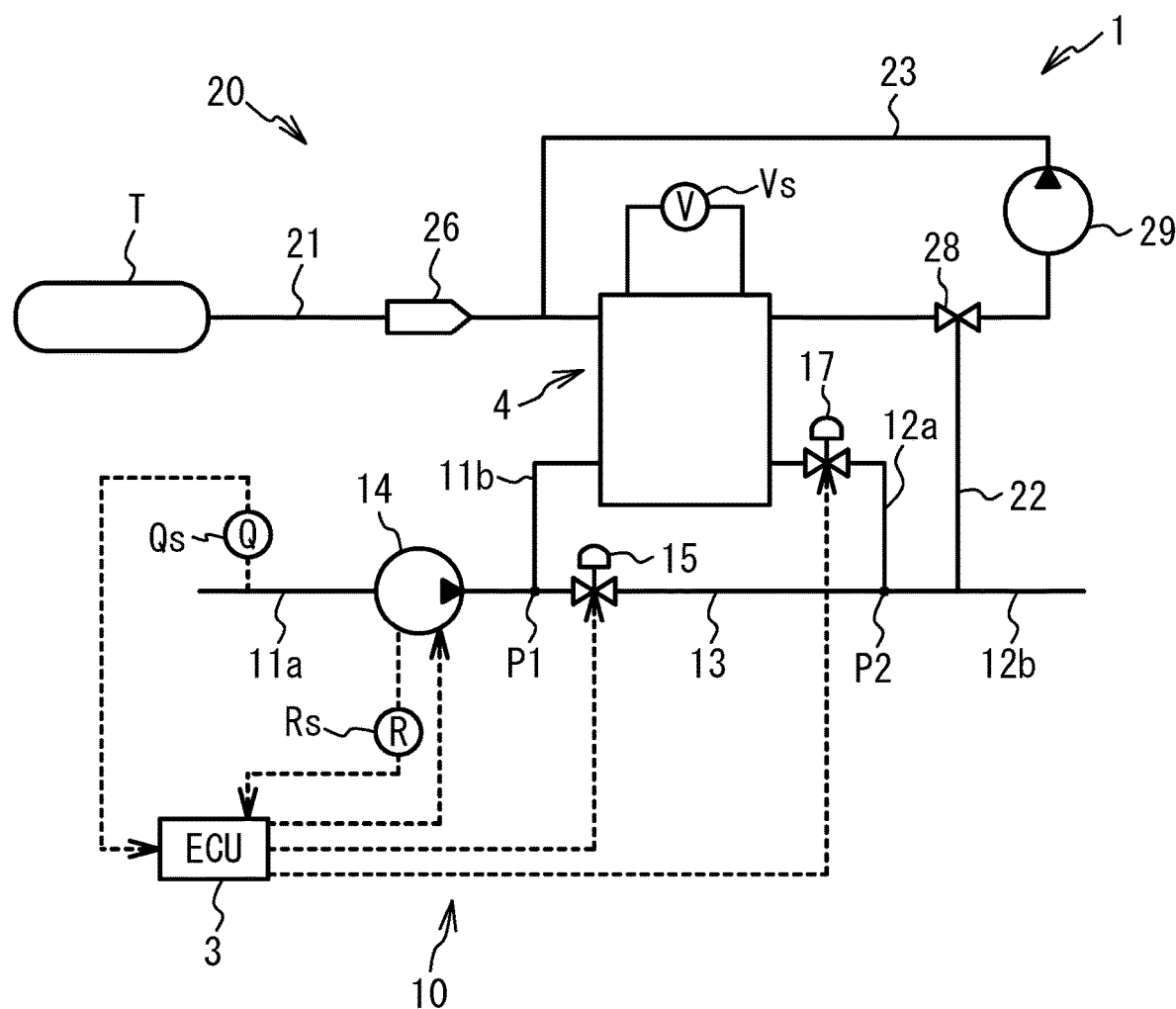
FIG. 1 is a schematic configuration view of a fuel cell system.

FIG. 1 is a schematic configuration view of a fuel cell system 1. The fuel cell system 1 is mounted in a vehicle such as a fuel cell vehicle, an electric vehicle, a hybrid vehicle, or the like, but is also applicable to various moving bodies other than the vehicle (for example, ships, airplanes, robots, etc.) and to stationary power sources. The fuel cell system 1 includes an electronic control unit (ECU) 3, an FC stack 4, an oxidant gas supply system 10, and a fuel gas supply system 20.

The FC stack 4 is a fuel cell stack that receives oxidant gas and fuel gas to generate electricity. The FC stack 4 is formed by stacking a plurality of solid polymer electrolyte type unit cells. The unit cell includes a membrane electrode assembly that is a power generator in which electrodes are arranged on both surfaces of an electrolyte membrane, and a pair of separators that sandwiches the membrane electrode assembly. The electrolyte membrane is a solid polymer membrane made of a fluorinated resin material or a hydrocarbon resin material having a sulfonic acid group. The electrolyte membrane has fine proton conductivity in a wet state. The electrode is configured to include a carbon carrier and an ionomer which is a solid polymer having a sulfonic acid group, and has fine proton conductivity in a wet state. A catalyst (for example, platinum or platinum-cobalt alloy) for accelerating the power generation reaction is carried on the carbon carrier. Each unit cell is provided with manifolds for flowing reaction gases and cooling water. The reaction gases flowing through the manifolds are supplied to a power generation region of each unit cell via gas flow paths provided in each unit cell. Further, the FC stack 4 is provided with a voltage sensor Vs for detecting a voltage.

The oxidant gas supply system 10 supplies air containing oxygen as the oxidant gas to the FC stack 4, and includes an upstream supply pipe 11a, a downstream supply pipe 11b, an upstream discharge pipe 12a, a downstream discharge pipe 12b, a bypass pipe 13, an air compressor 14, a bypass valve 15, and a pressure regulating valve 17. The upstream supply pipe 11a is an example of an upstream supply pipe connected to the air compressor 14. The downstream supply pipe 11b is connected to the upstream supply pipe 11a and a cathode inlet manifold of the FC stack 4. The upstream discharge pipe 12a is connected to a cathode outlet manifold of the FC stack 4. The downstream discharge pipe 12b is connected to the upstream discharge pipe 12a. The bypass pipe 13 is connected between a connection part P1 at which the upstream supply pipe 11a and the downstream supply pipe 11b are connected to each other, and a connection part P2 at which the upstream discharge pipe 12a and the downstream discharge pipe 12b are connected to each other.

The bypass valve 15 provided on the bypass pipe 13 opens and closes the bypass pipe 13. The pressure regulating valve 17 is provided on the upstream discharge pipe 12a. Closing the bypass valve 15 and opening the pressure regulating valve 17 bring a state into a supply state. In the supply state, the oxidant gas is supplied to the FC stack 4 from the upstream supply pipe 11a and the downstream supply pipe 11b, and is discharged from the upstream discharge pipe 12a and the downstream discharge pipe 12b. Since the bypass valve 15 is closed in the supply state, all of the oxidant gas flowing through the upstream supply pipe 11a is supplied to the FC stack 4. Also, opening the bypass valve 15 and closing the pressure regulating valve 17 bring a state into a bypass state. In the bypass state, the oxidant gas passes through the bypass pipe 13 from the upstream supply pipe 11a and is discharged from the downstream discharge pipe 12b, and the oxidant gas is restricted from flowing through the upstream discharge pipe 12a. Since the bypass valve 15 is opened and the pressure regulating valve 17 is closed in the bypass state, the flow rate of the oxidant gas supplied to the FC stack 4 is suppressed. In this way, the bypass valve 15 and the pressure regulating valve 17 are an example of a valve mechanism switchable between the supply state and the bypass state.

The air compressor 14 draws in air containing oxygen as an oxidant gas from one end of the upstream supply pipe 11a, and discharges it toward the other end thereof on the downstream side. Driving the air compressor 14 in the above supply state supplies a sufficient amount of the oxidant gas to the FC stack 4. The pressure regulating valve 17 adjusts back pressure on the cathode side of the FC stack 4 by controlling its opening degree in the above supply state. The air compressor 14, the bypass valve 15, and the pressure regulating valve 17 are controlled by the ECU 3. The air compressor 14 is a turbo type. The ECU 3 adjusts a flow rate of the oxidant gas supplied to the FC stack 4 by controlling a rotational speed of the air compressor 14. Further, the ECU 3 adjusts a flow rate of the oxidant gas supplied to the FC stack 4 and a flow rate of the bypassed oxidant gas by controlling the opening degrees of the bypass valve 15 and the pressure regulating valve 17.

A flow sensor Qs is provided upstream of the air compressor 14 on the upstream supply pipe 11a. The flow rate sensor Qs is an air flow meter that detects a flow rate of the oxidant gas passing through the upstream supply pipe 11a. The air compressor 14 is provided with a rotational speed sensor Rs that detects a rotational speed of the air compressor 14.

The fuel gas supply system 20 supplies hydrogen gas as the fuel gas to the FC stack 4, and includes a tank T, a supply pipe 21, a discharge pipe 22, a circulation pipe 23, a hydrogen injector 26, a discharge valve 28, and a hydrogen pump 29. The tank T is connected to an anode inlet manifold of the FC stack 4 through the supply pipe 21.

The tank T stores the hydrogen gas which is the fuel gas. The discharge pipe 22 has one end connected to the anode outlet manifold of the FC stack 4 and the other end connected to the downstream discharge pipe 12b of the oxidant gas supply system 10. However, the discharge pipe 22 is not limited thereto, and the other end of the discharge pipe 22 may be connected to the upstream discharge pipe 12a on the downstream side of the pressure regulating valve 17. The circulation pipe 23 is connected between the discharge pipe 22 and the supply pipe 21. The discharge valve 28 is provided at a connection part at which the discharge pipe 22 and the circulation pipe 23 are connected to each other. The hydrogen injector 26, the discharge valve 28, and the hydrogen pump 29 are controlled by the ECU 3. The fuel gas is supplied to the FC stack 4 by the hydrogen injector 26 injecting the fuel gas. By opening the discharge valve 28, liquid water is discharged outside the fuel cell system 1 through the discharge pipe 22 and the downstream discharge pipe 12b. The hydrogen pump 29 is provided on the circulation pipe 23. The fuel gas discharged from the FC stack 4 is appropriately pressurized by the hydrogen pump 29 and guided to the supply pipe 21.

The ECU 3 includes a central processing unit (CPU), a read only memory (ROM), and a random access memory (RAM). The ECU 3 controls the air compressor 14, the bypass valve 15, the pressure regulating valve 17, the hydrogen injector 26, the hydrogen pump 29, and the like in accordance with the required output to the FC stack 4, to control flow rates of the oxidant gas and the fuel gas supplied to the FC stack 4, and to control the output power of the FC stack 4. The voltage sensor Vs, the flow rate sensor Qs, and the rotational speed sensor Rs are electrically connected to the ECU 3. On the basis of the CPU, the ROM, and the RAM, the ECU 3 functionally achieves a voltage obtainer that obtains a voltage of the FC stack 4 detected by the voltage sensor Vs, a flow rate obtainer that obtains a flow rate detected by the flow rate sensor Qs, a rotational speed obtainer that obtains a rotational speed by the rotational speed sensor Rs, an intermittent operation executor that executes an intermittent operation, and a decrease process executor that executes an open-circuit voltage decrease process. Details will be described later.

The fuel cell system 1 also includes: a power control system that controls the power generated by the FC stack 4 by use of a DC/DC converter and an inverter; and a cooling system that cools the FC stack 4 with cooling water that circulates between a radiator and the FC stack 4.

[Intermittent Operation]

Next, a description will be given of the intermittent operation executed by the ECU 3. When a power output request to the FC stack 4 is not made, the ECU 3 temporarily stops the power generation of the FC stack 4 and controls the driving of the air compressor 14 so as to maintain the open-circuit voltage of the FC stack 4 at a predetermined target voltage v1 in the supply state in which the bypass valve 15 is closed and the pressure regulating valve 17 is opened. The case where the power output request to the FC stack 4 is not made is for example, a case where the vehicle is stopped and auxiliary devices for the vehicle are also stopped. The temporal stop of the power generation of the FC stack 4 is achieved in the following ways. The ECU 3 sets a target current value to zero, and controls a DC/DC converter (not illustrated) attached to the FC stack 4 so as to set a current value extracted from the FC stack 4 to zero. Alternatively, the ECU 3 controls a switch provided within the DC/DC converter to electrically disconnect the FC stack 4 and load devices.

Figure 2:
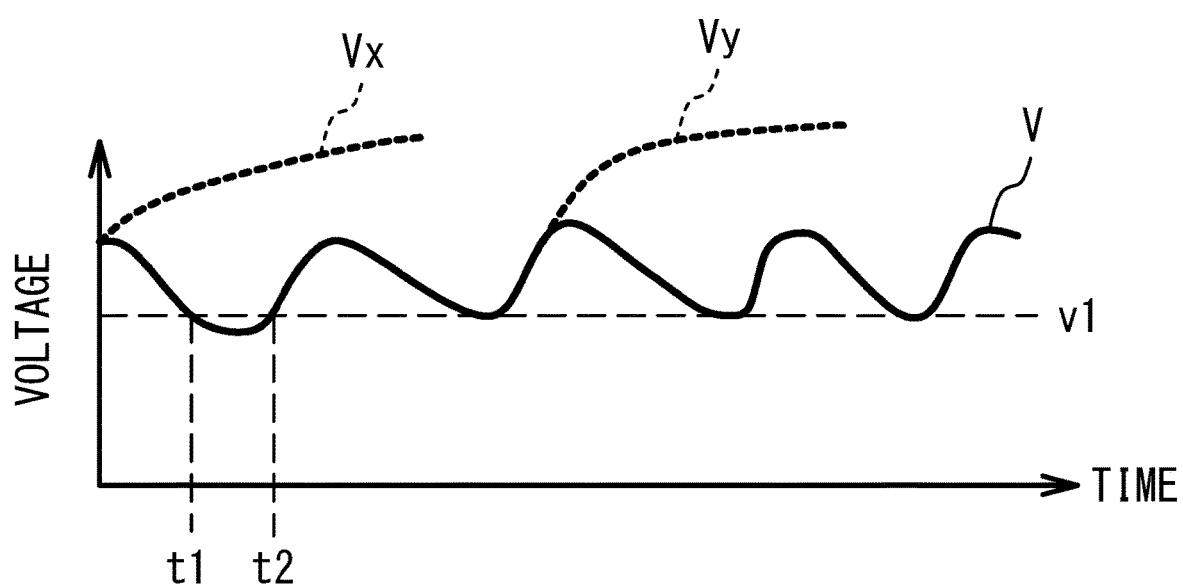
FIG. 2 is a timing chart illustrating a change in an open-circuit voltage of an FC stack during an intermittent operation.

FIG. 2 is a timing chart illustrating a change in the open-circuit voltage of the FC stack 4 during execution of the intermittent operation. In the intermittent operation, the air compressor 14 is driven intermittently. FIG. 2 illustrates the open-circuit voltage V under normal conditions and the open-circuit voltages Vx and Vy under abnormal conditions. First, normal conditions will be described. Under normal conditions, when the open-circuit voltage V is equal to or lower than the target voltage v1 at time t1, the ECU 3 drives the air compressor 14 to supply the oxidant gas to the FC stack 4. As a result, the open-circuit voltage V starts to increase. When the open-circuit voltage V exceeds the target voltage v1 at time t2, the ECU 3 stops driving the air compressor 14. When the driving of the air compressor 14 is stopped, the open-circuit voltage V gradually decreases. This is because hydrogen that has permeated from the anode side to the cathode side reacts with oxygen to generate water, which reduces the oxygen concentration on the cathode side. When the open-circuit voltage V decreases to be equal to or lower than the target voltage v1 again, the ECU 3 drives the air compressor 14 again to supply the oxidant gas to the FC stack 4. In this way, the open-circuit voltage V is maintained around the target voltage v1. During execution of the intermittent operation, the supply of the anode gas to the FC stack 4 is stopped while the FC stack 4 is sufficiently filled with the anode gas.

However, as illustrated in FIG. 2, the open-circuit voltage Vx might increase excessively beyond the target voltage v1 immediately after the intermittent operation starts, or the open-circuit voltage Vy might be too high during execution of the intermittent operation. The cause of the increase in the open-circuit voltage Vx immediately after the intermittent operation starts is as follows. A voltage (open-circuit voltage) of the FC stack 4 increases, when the FC stack 4 changes from the power generation state to the power generation temporarily stopped state. At this time, the oxidant gas remaining in the upstream supply pipe 11a and the downstream supply pipe 11b might be supplied to the FC stack 4, so that the open-circuit voltage might further increase. The cause of the increase in the open-circuit voltage Vy during execution of the intermittent operation is as follows. For example, outside air might flow into the upstream supply pipe 11a and the downstream supply pipe 11b during execution of the intermittent operation, and an excessive amount of the oxidant gas might be supplied to the FC stack 4.

The ECU 3 in the present embodiment executes the open-circuit voltage decrease process for suppressing such an excessive increase in open-circuit voltage. First, a description will be given of the open-circuit voltage decrease process that is executed before the intermittent operation starts, in order to suppress the increase in open-circuit voltage immediately after the intermittent operation starts.

[Open-Circuit Voltage Decrease Process Before Intermittent Operation Start]

Figure 3:
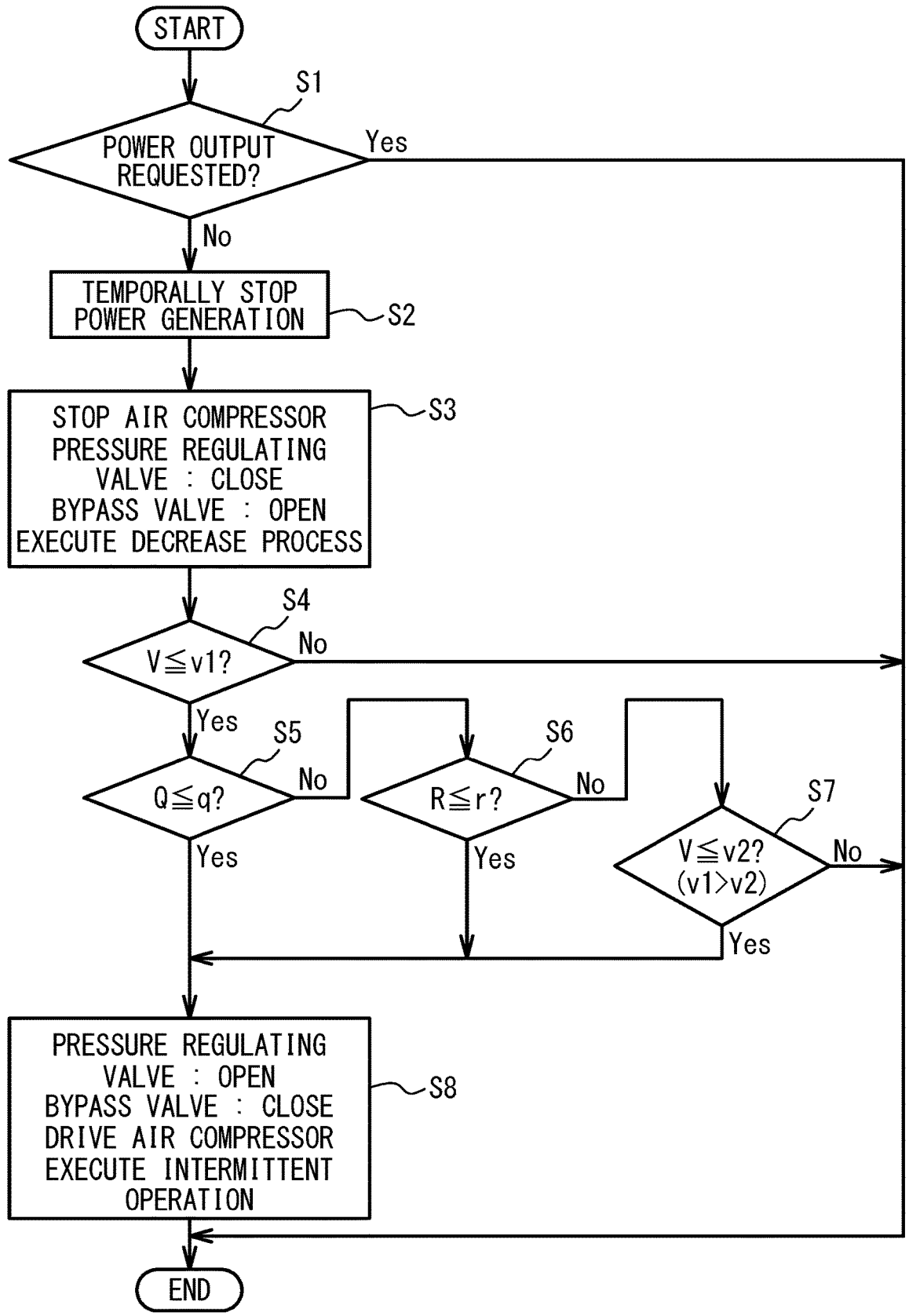
FIG. 3 is a flowchart illustrating an example of an open-circuit voltage decrease process executed by an ECU before the intermittent operation starts.

FIG. 3 is a flowchart illustrating an example of the open-circuit voltage decrease process executed by the ECU 3 before the intermittent operation starts. This control is repeatedly executed. In the description of this flowchart, the open-circuit voltage of the FC stack 4 detected by the voltage sensor Vs is referred to as an open-circuit voltage V. First, it is determined whether the power output request to the FC stack 4 is made or not (step S1). When Yes is determined in step S1, this control is finished. That is, the power generation of the FC stack 4 is continued, and the intermittent operation is not started. When No is determined in step S1, that is, when the power output request to the FC stack 4 is not made, the FC stack 4 is brought into the power generation temporarily stopped state (step S2).

Next, in the bypass state in which the air compressor 14 is stopped and the pressure regulating valve 17 is closed and the bypass valve 15 is opened, the open-circuit voltage decrease process starts (step S3). By stopping the air compressor 14, the supply of the oxidant gas to the FC stack 4 is suppressed. Further, as described above, the bypass state accelerates discharging the oxidant gas remaining in the upstream supply pipe 11a and the downstream supply pipe 11b outside from the bypass pipe 13 and the downstream discharge pipe 12b. In this way, the decrease of the open-circuit voltage V is accelerated, and the excessive increase in the open-circuit voltage V is suppressed. The process of step S3 is an example of a process executed by a decrease process executor.

Next, it is determined whether the open-circuit voltage V is equal to or lower than the target voltage v1 or not (step S4). When No is determined in step S4, this control is finished once, and the process of step S1 and subsequent steps are executed again. That is, since the reduction of the open-circuit voltage V by the open-circuit voltage decrease process is still insufficient, and the open-circuit voltage decrease process is continued. Herein, the target voltage v1 in step S4 is an example of a voltage threshold value, and the voltage threshold value is not limited thereto. Instead of the target voltage v1, a voltage threshold value lower than the target voltage v1 may be used.

When Yes is determined in step S4, it is determined whether the flow rate Q, detected by the flow rate sensor Qs, of the oxidant gas passing through the upstream supply pipe 11a is equal to or lower than a predetermined flow rate threshold q (step S5). A part of the flow rate Q of the oxidant gas passing through the upstream supply pipe 11a is supplied to the FC stack 4 through the downstream supply pipe 11b. In principle, the higher the flow rate Q is, the more the oxidant gas flows into the FC stack 4. Therefore, the flow rate Q is an example of a flow rate correlation value that correlates with the flow rate of the oxidant gas flowing to the FC stack 4. The flow rate Q is detected as a positive value, when the oxidant gas flows from the positive end of the upstream supply pipe 11a to the downstream side which is the air compressor 14. The flow rate threshold q is also set as a positive value. The flow rate threshold q is set to a flow rate of the oxidant gas in such a degree that the open-circuit voltage V is unlikely to excessively increase even if the intermittent operation starts when the open-circuit voltage V is equal to or lower than the target voltage v1. The flow rate threshold q may be a fixed value that is set beforehand or a variable value that is set based on a predetermined parameter.

When Yes is determined in step S5, it is conceivable that both the open-circuit voltage V and the flow rate Q of the oxidant gas have sufficiently decreased and that the open-circuit voltage V does not increase excessively. Thus, the air compressor 14 is driven to start the intermittent operation in the supply state in which the pressure regulating valve 17 is opened and the bypass valve 15 is closed (step S8). The process of step S8 is an example of a process executed by the intermittent operation executor.

When No is determined in step S5, it is determined whether or not the rotational speed R of the air compressor 14 detected by the rotational speed sensor Rs is equal to or lower than a predetermined rotational speed threshold value r (step S6). The rotational speed threshold value r is set to a rotational speed of the air compressor 14 in such a degree that the open-circuit voltage V is unlikely to excessively increase even if the intermittent operation starts when the open-circuit voltage V is equal to or lower than the target voltage v1 and the flow rate Q is higher than the flow rate threshold value q. The rotational speed threshold value r may be a fixed value or a variable value. When Yes is determined in step S6, the flow rate Q does not sufficiently decrease, but the open-circuit voltage V and the rotational speed R sufficiently decrease. It is thus conceivable that the open-circuit voltage V is unlikely to excessively increase, so the intermittent operation starts (step S8).

When No is determined in step S6, it is determined whether or not the open-circuit voltage V is lower than or equal to the lower limit voltage v2 that is lower than the target voltage v1 (step S7). The lower limit voltage v2 is set to a voltage in such a degree that the open-circuit voltage V is unlikely to excessively increase even if the intermittent operation starts when the flow rate Q is higher than the flow rate threshold q and the rotational speed R is higher than the rotational speed threshold r. When Yes is determined in step S7, the flow rate Q and the rotational speed R do not sufficiently decrease, but the open-circuit voltage V further decreases. It is thus conceivable that the open-circuit voltage V does not excessively increase, so the intermittent operation starts (step S8). When No is determined in step S7, similar to a case where No is determined in step S4, the control is finished once, and the process of step S1 and subsequent processes are executed again. As described above, the processes of steps S4 to S7 correspond to the execution conditions for executing the intermittent operation.

Figure 4:
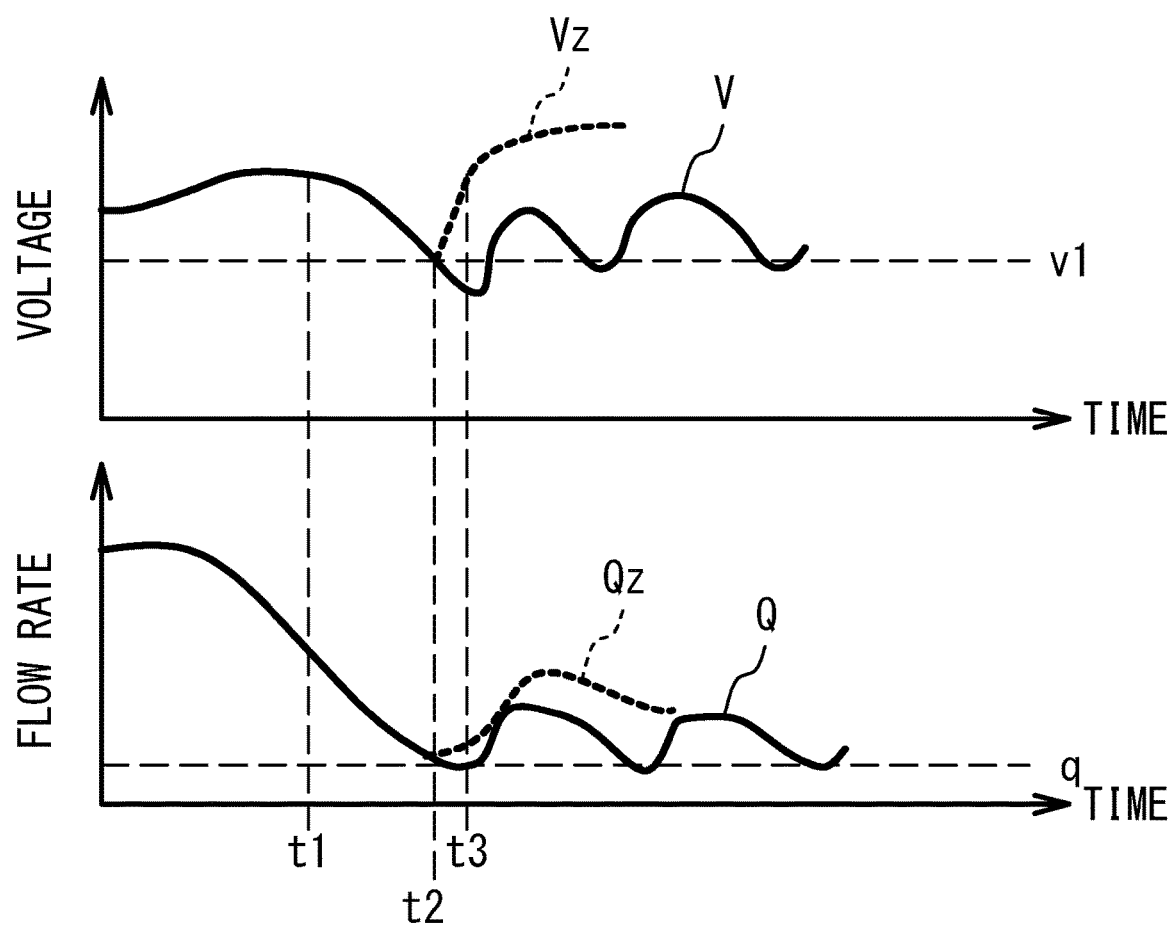
FIG. 4 is a first example of a timing chart when the open-circuit voltage decrease process is executed before the intermittent operation starts.

Next, the control described above will be described using timing charts as examples. FIG. 4 is a first example of a timing chart when the open-circuit voltage decrease process is executed before the intermittent operation starts. As illustrated in FIG. 4, when the power generation temporally stops and the open-circuit voltage decrease process is executed at time t1 (steps S2 and S3), the open-circuit voltage V gradually decreases. After the open-circuit voltage V is equal to or lower than the target voltage v1 at time t2 (Yes in step S4), when the flow rate Q is equal to or lower than the flow rate threshold value q at time t3 (Yes in step S5), the intermittent operation starts (step S8).

Herein, if the intermittent operation starts at time t2 without executing the process of step S5, the oxidant gas remaining in the upstream supply pipe 11a and the oxidant gas introduced from the outside by driving the air compressor 14 might be supplied to the FC stack 4, so that the flow rate Qz might increase, which might excessively increase the open-circuit voltage like the open-circuit voltage Vz. Since the condition for starting the intermittent operation includes not only a condition that the open-circuit voltage V is equal to or lower than the target voltage v1 but also a condition that the flow rate Q is equal to or lower than the flow rate threshold q, the occurrence of such a problem is suppressed.

Figure 5:
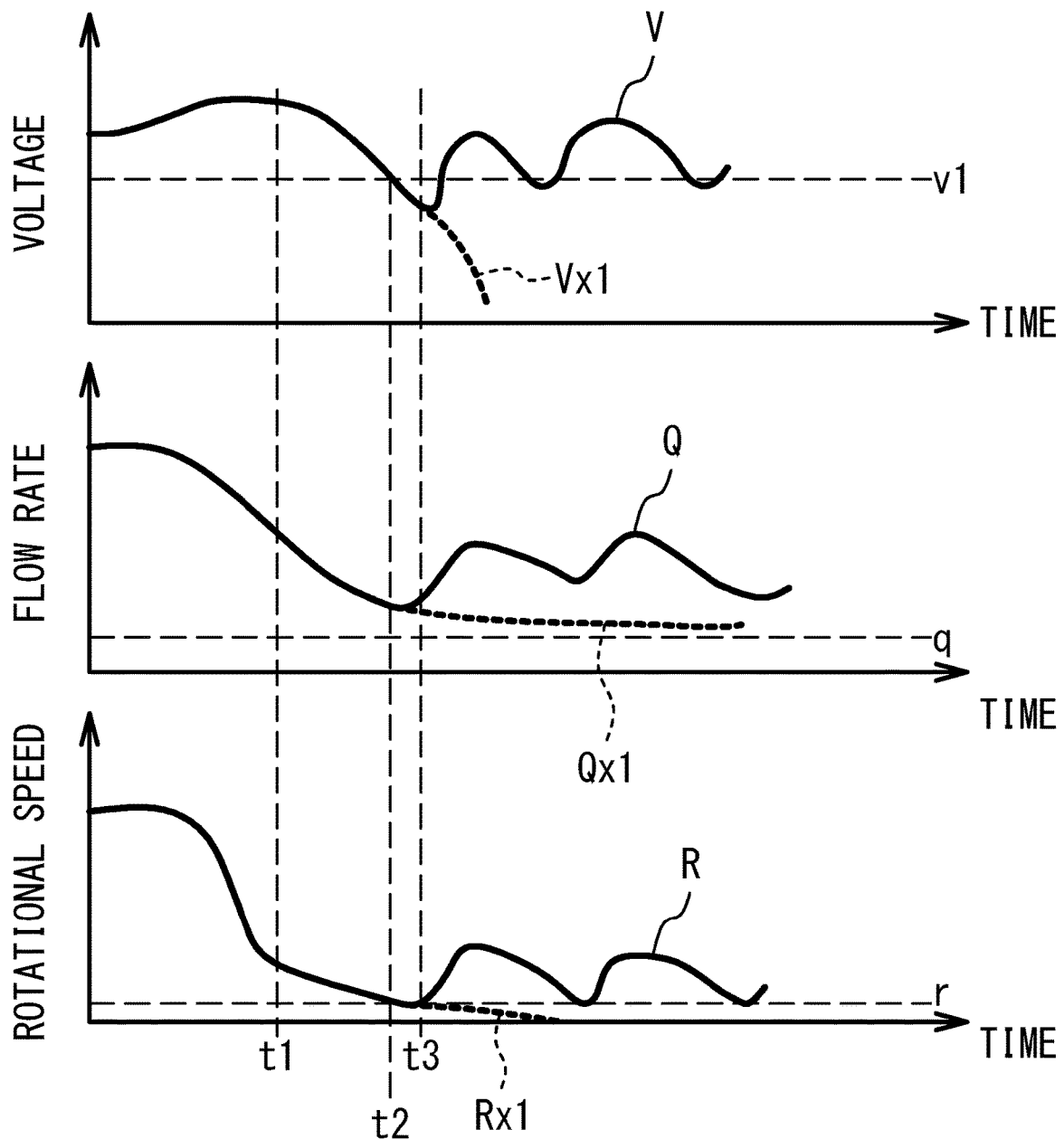
FIG. 5 is a second example of a timing chart when the open-circuit voltage decrease process is executed before the intermittent operation starts.

FIG. 5 is a second example of a timing chart when the open-circuit voltage decrease process is executed before the intermittent operation starts. The power generation temporally stops and the open-circuit voltage decrease process is executed at time t1 (steps S2 and S3). The open-circuit voltage V is equal to or lower than the target voltage v1 at time t2 (Yes in step S4). Even when the flow rate Q is higher than the flow rate threshold value q (No in step S5), when the rotational speed R of the air compressor 14 is equal to or lower than the rotational speed threshold value r at time t3 (Yes in step S6), the intermittent operation starts (step S8).

Herein, if the intermittent operation does not start only on the basis of a flow rate Qx1 illustrated in FIG. 5 being higher than the flow rate threshold q, both the rotational speed Rx1 and the open-circuit voltage Vx1 further decrease. This might degrade the power generation performance of the FC stack 4. The reason why the flow rate Qx1 does not fall below the flow rate threshold value q is that, for example, a large amount of air might be introduced from the outside into the upstream supply pipe 11a and the downstream supply pipe 11b, or there might be a difference in the detection accuracy of the flow rate sensor Qs. In the present embodiment, even if the flow rate Q is higher than the flow rate threshold value q, the intermittent operation starts, when the rotational speed R is equal to or lower than the rotational speed threshold value r. This suppresses the occurrence of the above problems.

Figure 6:
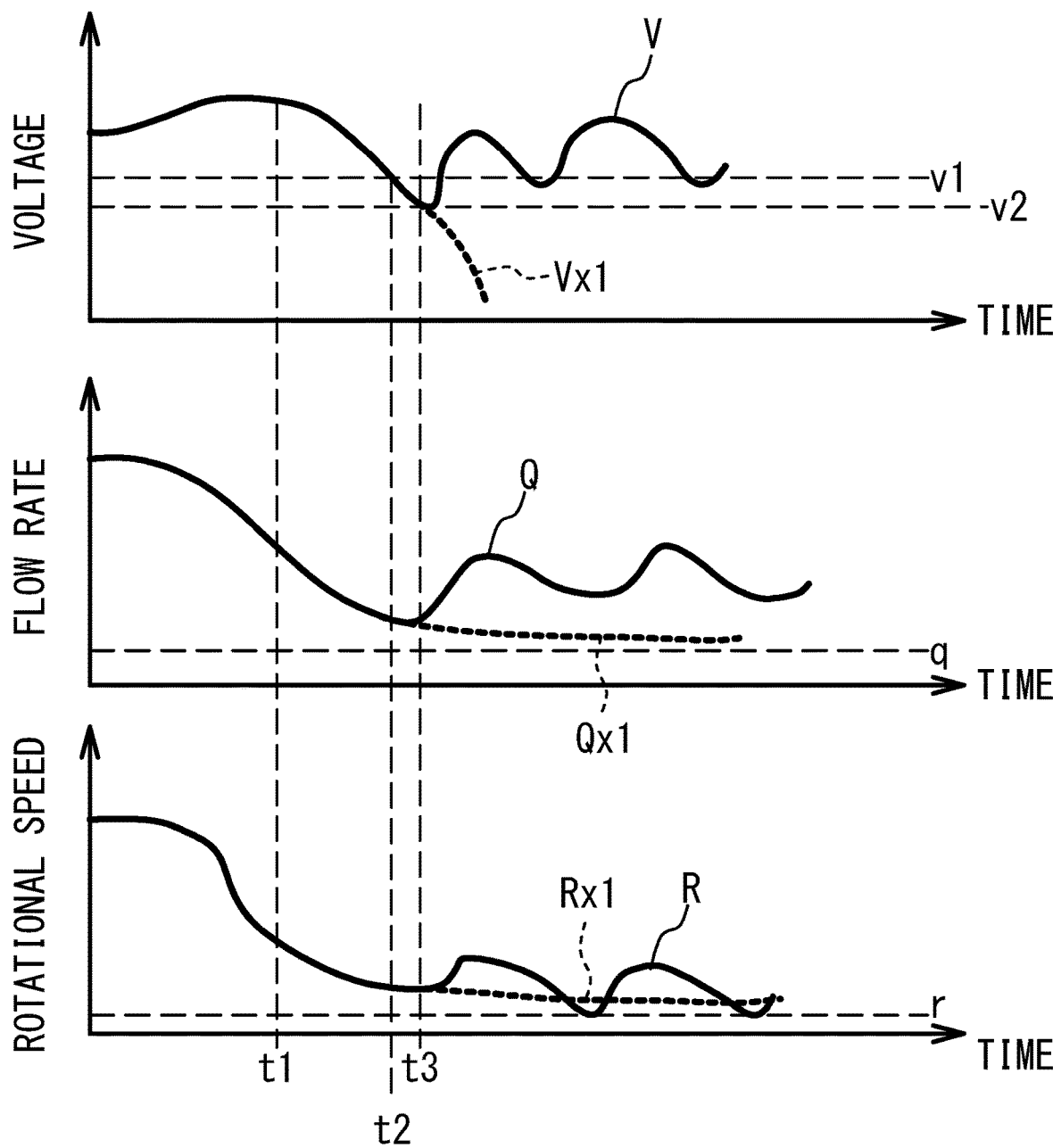
FIG. 6 is a third example of a timing chart when the open-circuit voltage decrease process is executed before the intermittent operation starts.

FIG. 6 is a third example of a timing chart when the open-circuit voltage decrease process is executed before the intermittent operation starts. After the power generation is temporally stopped at time t1 and the open-circuit voltage decrease process is executed (steps S2 and S3), the open-circuit voltage V is equal to or lower than the target voltage v1 at time t2 (Yes at step S4). Even when the flow rate Q is higher than the threshold value q (No in step S5) and the rotational speed R is higher than the rotational speed threshold value r (No in step S6), if the open-circuit voltage V is equal to or lower than the lower limit voltage v2 (Yes in step S7), the intermittent operation starts (step S8).

Herein, as illustrated in FIG. 6, if the intermittent operation does not start only on the basis of the flow rate Qx1 being higher than the flow rate threshold value q and the rotational speed Rx1 being higher than the rotational speed threshold value r, the open-circuit voltage Vx1 further decreases. In the present embodiment, even if the flow rate Q is higher than the flow rate threshold value q and the rotational speed R is higher than the rotational speed threshold value r, the intermittent operation starts when the open-circuit voltage V is equal to or lower than the lower limit voltage v2. It is therefore possible to suppress the occurrence of such problems.

Regarding the flowchart illustrated in FIG. 3, the flow rate Q detected by the flow rate sensor Qs provided in the upstream supply pipe 11a is used in step S5. However, a flow rate is not limited thereto, and a flow rate detected by a flow rate sensor provided in the downstream supply pipe 11b may be used. Instead of using the flow rate detected by such a flow rate sensor as the flow rate correlation value, an estimated value of a flow rate of the oxidant gas flowing into the FC stack 4 may be used. For example, the above estimated value may be calculated based on the flow rate Q detected by the flow rate sensor Qs provided in the upstream supply pipe 11a, and on a flow rate ratio, experimentally obtained in advance, of the oxidant gas flowing through the downstream supply pipe 11b to the oxidant gas flowing through the bypass pipe 13 in a state where the pressure regulating valve 17 is closed and the bypass valve 15 is opened.

Instead of step S7, it may be determined whether or not a decreasing speed of the open-circuit voltage V is equal to or higher than a speed threshold value. The speed threshold value is set in such a degree that the open-circuit voltage V is unlikely to excessively increase even if the intermittent operation starts when the open-circuit voltage V is equal to or lower than the target voltage v1, when the flow rate Q is higher than the flow rate threshold value q, and when the rotational speed R is higher than the rotational speed threshold value r. When Yes is determined in this determination, the flow rate Q and the rotational speed R does not sufficiently decrease, but the decreasing speed of the open-circuit voltage V is high. It is thus conceivable that the open-circuit voltage V is unlikely to excessively increase, and the intermittent operation starts (Step S8). When No is determined in this determination, like when No is determined in step S4, the control is finished once, and the process of step S1 and subsequent processes are executed again.

The intermittent operation may start after a predetermined time has elapsed from the time when Yes is determined in any of steps S5 to S7 (step S8). This is because, in consideration of a difference in detection accuracy of a sensor, an excessive increase in open-circuit voltage is sufficiently suppressed.

Steps S5 to S7 may not always be adopted. Further, in a case where step S5 is adopted and steps S6 and S7 are not adopted, when No is determined in step S5, this control may finish. In a case where steps S5 and S6 are adopted and step S7 is not adopted, when No is determined in step S6, this control may finish. In a case where steps S5 and S7 are adopted and step S6 is not adopted, when No is determined in step S5, the process of step S7 may be executed.

[Open-Circuit Voltage Decrease Process During Intermittent Operation]

Figure 7:
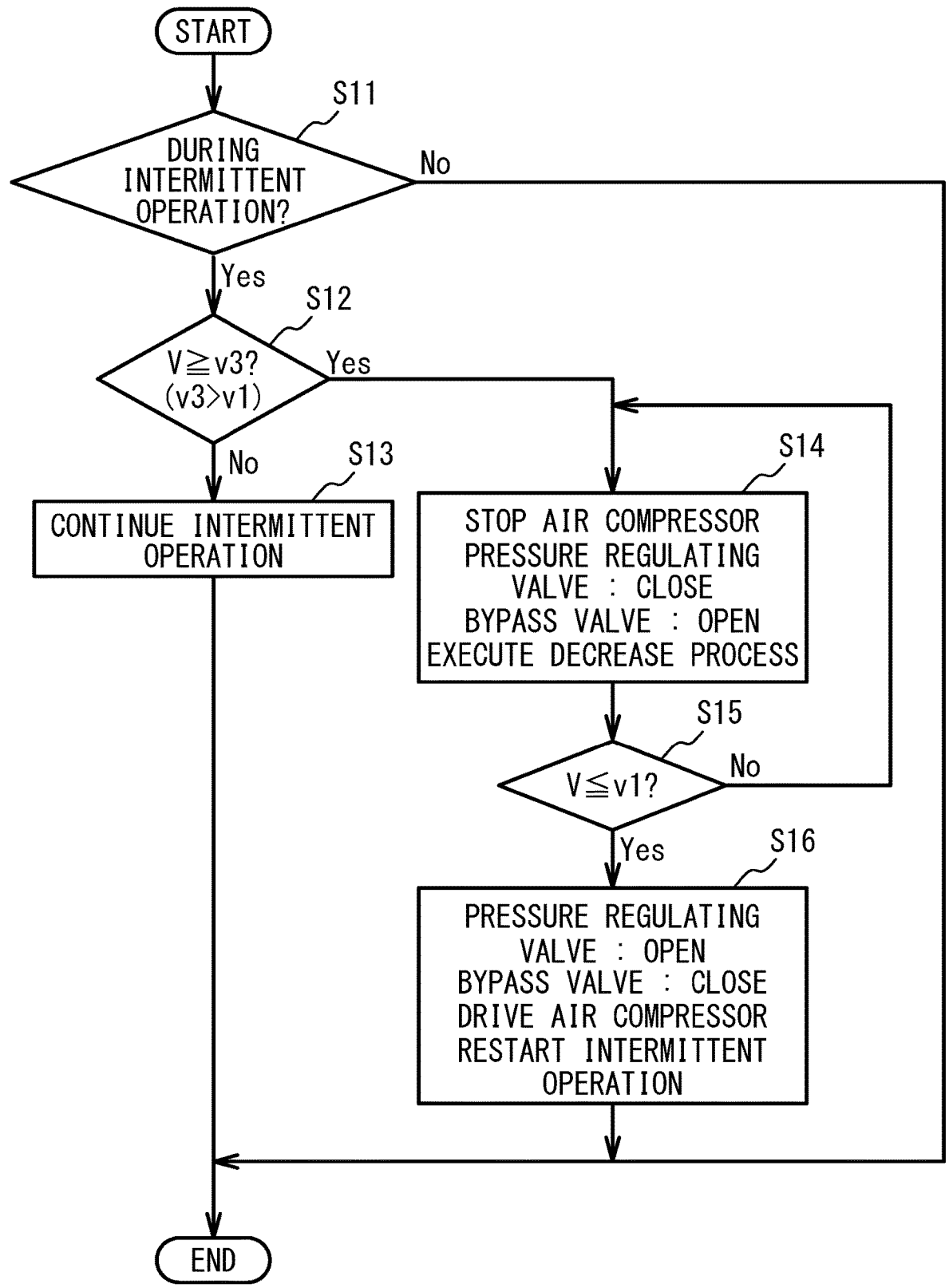
FIG. 7 is a flowchart illustrating an example of the open-circuit voltage decrease process executed by the ECU during execution of the intermittent operation.

Next, a description will be given of the open-circuit voltage decrease process executed during intermittent operation. FIG. 7 is a flowchart illustrating an example of the open-circuit voltage decrease process executed by the ECU 3 during execution of the intermittent operation. This control is repeatedly executed. First, it is determined whether or not the intermittent operation is being executed (step S11).

When No is determined in step S11, this control is finished.

When Yes is determined in step S11, it is determined whether or not the open-circuit voltage V is equal to or higher than the upper limit voltage v3 (step S12). The upper limit voltage v3 is higher than the target voltage v1, and is set to a voltage value at which it is desirable to forcibly reduce the open-circuit voltage. For example, the upper limit voltage v3 may be set to a value that is lower by a predetermined margin than a voltage threshold value that is used to determine whether or not the FC stack 4 starts generating power in order to reduce the excessively increased open-circuit voltage. When No is determined in step S12, the intermittent operation is continued (step S13).

When Yes is determined in step S12, it is conceivable that the open-circuit voltage V excessively increases. Thus, the air compressor 14 stops, and the open-circuit voltage decrease process is executed in the bypass state in which the pressure regulating valve 17 is closed and the bypass valve 15 is opened (step S14). The process of step S14 is an example of a process executed by the decrease process executor.

Next, it is determined whether or not the open-circuit voltage V is equal to or lower than the target voltage v1 by executing the open-circuit voltage decrease process (step S15). The target voltage v1 in step S15 is an example of a voltage threshold value. The lower limit voltage v2 may be used instead of the target voltage v1, or another voltage threshold value smaller than the target voltage v1 may be used. When No is determined in step S15, the process of step S14 is executed again.

When Yes is determined in step S15, it is conceivable that the open-circuit voltage V sufficiently decreases. Thus, the pressure regulating valve 17 is opened, the bypass valve 15 is closed, and then the air compressor 14 is driven to restart the intermittent operation (step S16). In this way, the open-circuit voltage V decreases, even if the open-circuit voltage V excessively increases during execution of the intermittent operation. The process of step S15 corresponds to the execution condition for executing the intermittent operation.

Figure 8:
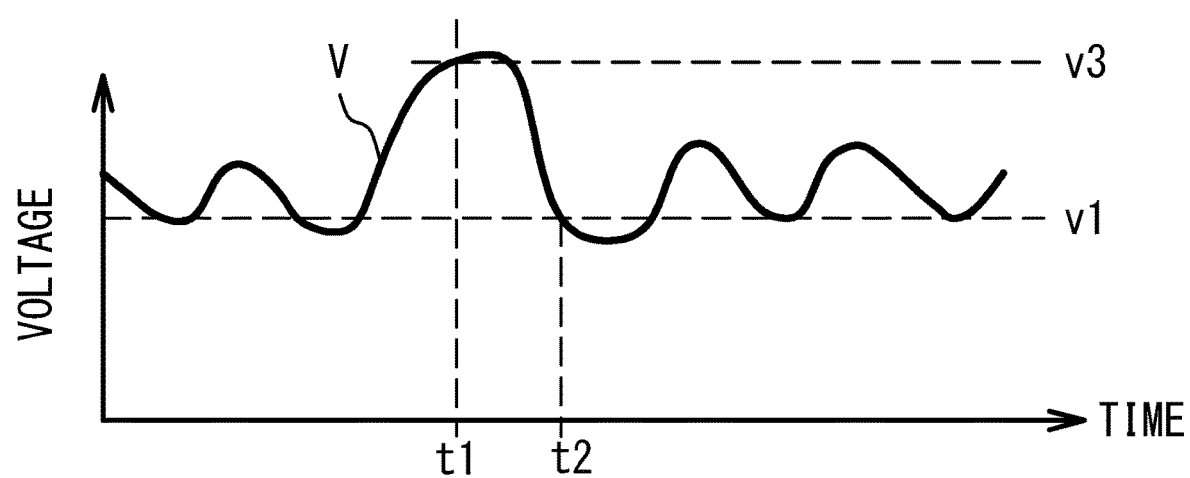
FIG. 8 is an example of a timing chart when the open-circuit voltage decrease process is executed during execution of the intermittent operation.

Next, the above control will be described with reference to a timing chart as an example. FIG. 8 is an example of a timing chart when the open-circuit voltage decrease process is executed during execution of the intermittent operation. When the open-circuit voltage V is equal to or higher than the upper limit voltage v3 at time t1 during execution of the intermittent operation (Yes in steps S11 and S12), the open-circuit voltage decrease process is executed (step S14). When the open-circuit voltage V gradually decreases to be equal to or lower than the target voltage v1 at time t2 (Yes in step S15), the intermittent operation restarts again (step S16).

In the above example, the intermittent operation restarts when the open-circuit voltage V is equal to or lower than the target voltage v1 in steps S15 and S16, but these processes are not limited thereto. For example, instead of step S15, steps S4 to S7 may be adopted as illustrated in FIG. 3.

In the above-described embodiment, the bypass valve 15 provided in the bypass pipe 13 and the pressure regulating valve 17 provided in the upstream discharge pipe 12a are described as an example of the valve mechanism, but the valve mechanism is not limited thereto. For example, a sealing valve as the valve mechanism may be provided in the downstream supply pipe 11b instead of the pressure regulating valve 17, and the sealing valve may be opened during execution of the intermittent operation and may be closed during execution of the open-circuit voltage decrease process, like the pressure regulating valve 17. Further, in addition to the pressure regulating valve 17, a sealing valve as the valve mechanism may be provided in the downstream supply pipe 11b, and both the pressure regulating valve 17 and the sealing valve may be opened during execution of the intermittent operation, and only one thereof may be closed during the open-circuit voltage decrease process.

Further, instead of the bypass valve 15 and the pressure regulating valve 17, a three-way valve as the valve mechanism may be provided at the connection part P1, and the three-way valve may be controlled such that the upstream supply pipe 11a and the downstream supply pipe 11b communicate with each other and the bypass pipe 13 is blocked during execution of the intermittent operation, and such that the upstream supply pipe 11a, the downstream supply pipe 11b, and the bypass pipe 13 communicate with one another during execution of the open-circuit voltage decrease process. Further, instead of the bypass valve 15 and the pressure regulating valve 17, a three-way valve as the valve mechanism may be provided at the connection part P2, and the three-way valve may be controlled such that the upstream discharge pipe 12a and the downstream discharge pipe 12b communicate with each other and the bypass pipe 13 is blocked during execution of the intermittent operation, and such that the upstream discharge pipe 12a, the downstream discharge pipe 12b, and the bypass pipe 13 communicate with one another during execution of the open-circuit voltage decrease process.

[Variation]

Figure 9:
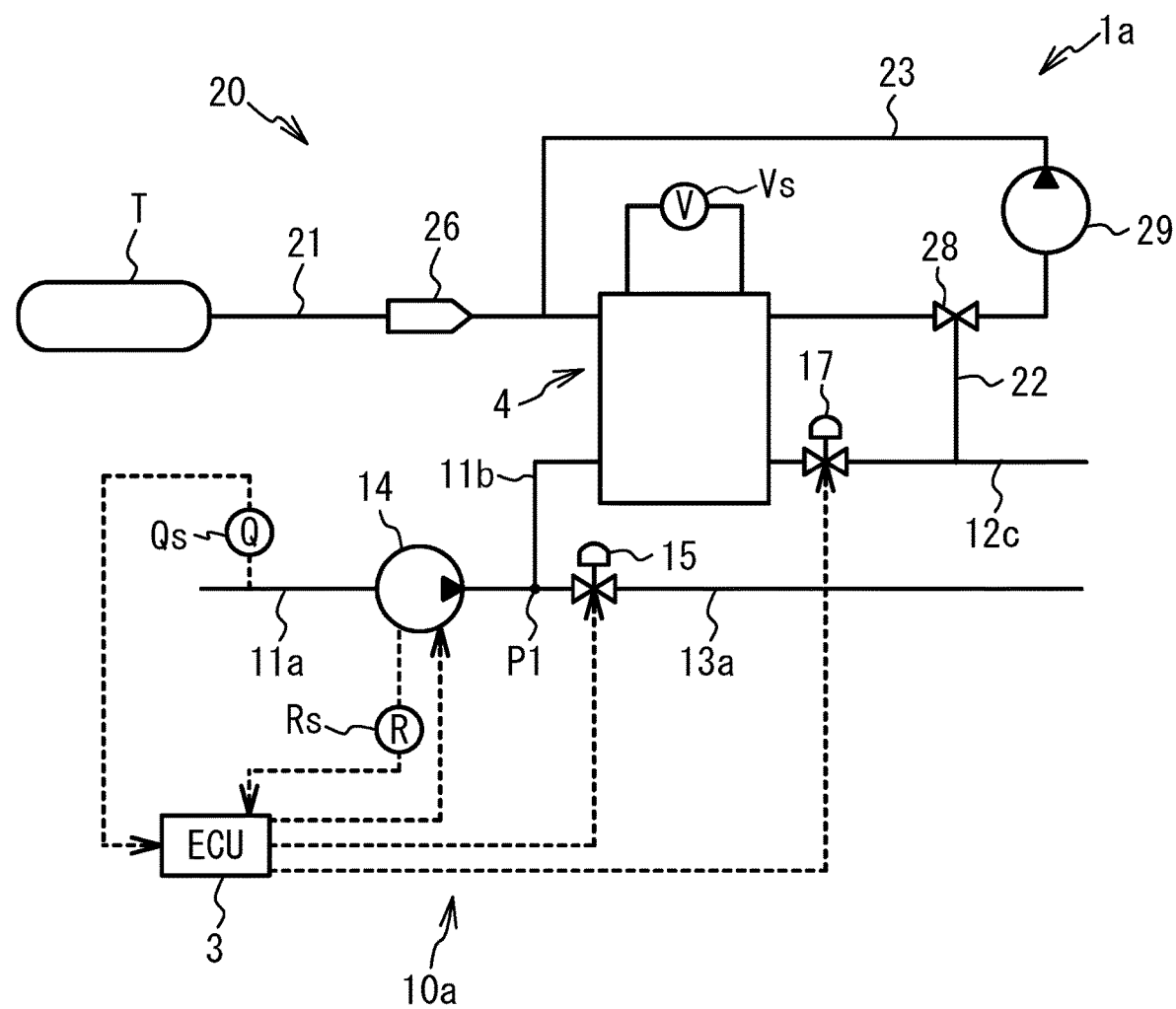
FIG. 9 is a schematic configuration view of a fuel cell system according to a variation.

FIG. 9 is a schematic configuration view of a fuel cell system 1a according to a variation. The same components as those in the above-described embodiment are designated by the same reference numerals, and duplicated description will be omitted. An oxidant gas supply system 10a includes a discharge pipe 12c and a bypass pipe 13a, instead of the upstream discharge pipe 12a, the downstream discharge pipe 12b, and the bypass pipe 13 described above. The bypass pipe 13a is not directly connected to the discharge pipe 12c. That is, one end of the bypass pipe 13a is connected to the connection part P1, but the other end is not connected to the discharge pipe 12c and is exposed to the outside air.

Therefore, in the supply state in which the bypass valve 15 is closed and the pressure regulating valve 17 is opened, the oxidant gas passes through the FC stack 4 through the upstream supply pipe 11a and the downstream supply pipe 11b and is discharged from the discharge pipe 12c. In the bypass state in which the bypass valve 15 is opened and the pressure regulating valve 17 is closed, the oxidant gas passes through the upstream supply pipe 11a and is discharged from the bypass pipe 13a, and the oxidant gas is restricted from passing through the discharge pipe 12c. Even in such a configuration, the control illustrated in FIG. 3 or 7 is executed, which suppresses the open-circuit voltage from excessively increasing.

Also in the above-described variation, instead of the bypass valve 15 and the pressure regulating valve 17, a three-way valve as the valve mechanism may be provided in the connection part P1, and the three-way valve may be controlled such that the upstream supply pipe 11a and the downstream supply pipe 11b communicate with each other and the bypass pipe 13a is blocked during execution of the intermittent operation, and such that the upstream supply pipe 11a, the downstream supply pipe 11b, and the bypass pipe 13a communicate with one another during execution of the open-circuit voltage decrease process.

[Others]

In the above-described embodiment and variation, the supply state in which the bypass valve 15 is fully closed has been described as an example, but the bypass state is not limited thereto. In the bypass state, the bypass valve 15 may be slightly opened in such a degree that a small flow rate of the oxidant gas flows through the bypass pipe 13 in comparison with the flow rate of the oxidant gas supplied to the FC stack 4.

Instead of the flow rate sensor Qs provided in the upstream supply pipe 11a, a flow rate sensor may be provided in each of the downstream supply pipe 11b and the bypass pipe 13, and a flow rate supplied to the FC stack 4 may be estimated by comprehensively judging the flow rates detected by both flow rate sensors.

In the above description, during execution of the intermittent operation, the air compressor 14 is driven when the open-circuit voltage V is equal to or lower than the target voltage v1, and the air compressor 14 is stopped when the open-circuit voltage V is higher than the target voltage v1. However, the present disclosure is not limited thereto. For example, the air compressor 14 may be driven when the open-circuit voltage V is equal to or lower than a target lower limit voltage, and the air compressor 14 may be stopped when the open-circuit voltage V is equal to or higher than a target upper limit voltage that is higher than the target lower limit voltage, which may maintain the open-circuit voltage V between the target lower limit voltage and the target upper limit voltage.

Although some embodiments of the present disclosure have been described in detail, the present disclosure is not limited to the specific embodiments but may be varied or changed within the scope of the present disclosure as claimed.

The invention claimed is:

1. A fuel cell system comprising:
a fuel cell;
an air compressor that supplies oxidant gas to the fuel cell;
an upstream supply pipe provided with the air compressor;
  a downstream supply pipe connected to the upstream supply pipe and the fuel cell;
  an upstream discharge pipe connected to the fuel cell, the oxidant gas being discharged from the fuel cell to the upstream discharge pipe;
  a downstream discharge pipe connected to the upstream discharge pipe;
  a bypass pipe, one end of the bypass pipe being connected to a first connection part where the upstream supply pipe is connected to the downstream supply pipe, another end of the bypass pipe being connected to a second connection part where the upstream discharge pipe is connected to the downstream discharge pipe;
  a valve mechanism configured to be switchable between a supply state and a bypass state, the supply state being a state where the oxidant gas is supplied to the fuel cell from the upstream supply pipe and the downstream supply pipe and is discharged from the upstream discharge pipe and the downstream discharge pipe, the bypass state being a state where the oxidant gas passes through the bypass pipe from the upstream supply pipe and is discharged from the downstream discharge pipe and where the oxidant gas is restricted from passing through one of the downstream supply pipe and the upstream discharge pipe; and
  a controller configured to control the air compressor, the valve mechanism, and a power generation state of the fuel cell,
  wherein the controller is configured to include:
  a voltage obtainer configured to obtain an open-circuit voltage which is a voltage of the fuel cell in a power generation temporarily stopped state;
    an intermittent operation executor configured to execute an intermittent operation for maintaining the open-circuit voltage at a target voltage, by bringing the fuel cell into the power generation temporarily stopped state, by bringing the valve mechanism into the supply state, and by intermittently driving the air compressor, when a power output request to the fuel cell is not made; and
    a decrease process executor configured to execute an open-circuit voltage decrease process for accelerating a decrease in the open-circuit voltage, by bringing the valve mechanism into the bypass state and by stopping the air compressor in the power generation temporarily stopped state.

2. A fuel cell system comprising:
a fuel cell;
an air compressor that supplies oxidant gas to the fuel cell;
an upstream supply pipe provided with the air compressor;
  a downstream supply pipe connected to the upstream supply pipe and the fuel cell;
  a discharge pipe connected to the fuel cell, the oxidant gas being discharged from the fuel cell to the discharge pipe;
  a bypass pipe, one end of the bypass pipe being connected to a connection part where the upstream supply pipe is connected to the downstream supply pipe, another end of the bypass pipe is exposed to outside air;
  a valve mechanism configured to be switchable between a supply state and a bypass state, the supply state being a state where the oxidant gas is supplied to the fuel cell from the upstream supply pipe and the downstream supply pipe and is discharged from the discharge pipe, the bypass state being a state where the oxidant gas passes through the upstream supply pipe and is discharged from the bypass pipe and where the oxidant gas is restricted from passing through one of the downstream supply pipe and the discharge pipe; and
  a controller configured to control the air compressor, the valve mechanism, and a power generation state of the fuel cell,
  wherein the controller is configured to include:
    a voltage obtainer configured to obtain an open-circuit voltage which is a voltage of the fuel cell in a power generation temporarily stopped state;
    an intermittent operation executor configured to execute an intermittent operation for maintaining the open-circuit voltage at a target voltage, by bringing the fuel cell into the power generation temporarily stopped state, by bringing the valve mechanism into the supply state, and by intermittently driving the air compressor, when a power output request to the fuel cell is not made; and
    a decrease process executor configured to execute an open-circuit voltage decrease process for accelerating a decrease in the open-circuit voltage, by bringing the valve mechanism into the bypass state and by stopping the air compressor in the power generation temporarily stopped state.

3. The fuel cell system according to claim 1, wherein the decrease process executor is configured to execute the open-circuit voltage decrease process, when the power output request to the fuel cell is not made, before the intermittent operation starts.

4. The fuel cell system according to claim 1, wherein the decrease process executor is configured to execute the open-circuit voltage decrease process, when the open-circuit voltage is equal to or higher than an upper limit voltage higher than the target voltage during execution of the intermittent operation.

5. The fuel cell system according to claim 1, wherein
the intermittent operation executor is configured to execute the intermittent operation, when an execution condition of the intermittent operation is satisfied during execution of the open-circuit voltage decrease process, and
the execution condition includes a condition that the open-circuit voltage is equal to or lower than a voltage threshold value.

6. The fuel cell system according to claim 5, wherein
the controller is configured to include a flow rate obtainer configured to obtain a flow rate correlation value that correlates with a flow rate of the oxidant gas flowing to the fuel cell, and
the execution condition includes a condition that the flow rate correlation value is equal to or smaller than a flow rate threshold value.

7. The fuel cell system according to claim 6, wherein
the execution condition includes a condition that the open-circuit voltage is equal to or lower than the voltage threshold value, the flow rate correlation value is greater than the flow rate threshold value, and the open-circuit voltage is equal to or lower than a lower limit voltage lower than the voltage threshold value.

8. The fuel cell system according to claim 6, wherein the execution condition includes a condition that the open-circuit voltage is equal to or lower than the voltage threshold value, the flow rate correlation value is greater than the flow rate threshold value, and a decreasing speed of the open-circuit voltage is equal to or higher than a speed threshold value.

9. The fuel cell system according to claim 6, wherein
the controller is configured to include a rotational speed obtainer configured to obtain a rotational speed of the air compressor, and
the execution condition includes a condition that the open-circuit voltage is equal to or lower than the voltage threshold value, the flow rate correlation value is greater than the flow rate threshold value, and the rotational speed is equal to or lower than a rotational speed threshold value.

* * * * *